(12) United States Patent
Choung et al.

(10) Patent No.: US 11,970,617 B2
(45) Date of Patent: Apr. 30, 2024

(54) METHOD FOR PREPARING LATEX COMPOSITION FOR DIP-FORMING

(71) Applicant: KOREA KUMHO PETROCHEMICAL CO., LTD., Seoul (KR)

(72) Inventors: Sung Hun Choung, Daejeon (KR); Jeong Weon Han, Daejeon (KR); Eunsoo Kang, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 0 days.

(21) Appl. No.: 17/827,001

(22) Filed: May 27, 2022

(65) Prior Publication Data
US 2022/0380580 A1 Dec. 1, 2022

(30) Foreign Application Priority Data
May 27, 2021 (KR) .................. 10-2021-0067978

(51) Int. Cl.
*C08L 9/04* (2006.01)
(52) U.S. Cl.
CPC ...................................... *C08L 9/04* (2013.01)
(58) Field of Classification Search
CPC .......... C08L 9/04; C08L 3/02; C08L 2201/06; C08L 2201/52; C08F 220/06; C08F 2/26; A41D 19/0055
See application file for complete search history.

(56) References Cited

U.S. PATENT DOCUMENTS

| 10,377,882 | B2 | 8/2019 | Ng et al. |
| 10,377,884 | B2 | 8/2019 | Yokoyama et al. |
| 10,703,884 | B2 | 7/2020 | Kim |
| 2023/0054173 | A1* | 2/2023 | Kang .................... C08F 220/06 |

FOREIGN PATENT DOCUMENTS

| CN | 101654500 A | 2/2010 | |
| CN | 107922676 A | 4/2018 | |
| JP | 2018505916 A | 3/2018 | |
| JP | 2018516282 A | 6/2018 | |
| KR | 10-2017-0060254 A | 6/2017 | |
| WO | WO-2017090882 A1 * | 6/2017 | ............ B29C 41/00 |

* cited by examiner

*Primary Examiner* — Robert D Harlan
(74) *Attorney, Agent, or Firm* — NKL Law; Jae Youn Kim

(57) ABSTRACT

An exemplary embodiment provides a method for preparing a latex composition for dip forming, the method including: (a) preparing a monomer mixture including a conjugated diene-based monomer, an ethylenically unsaturated nitrile monomer and an ethylenically unsaturated acid monomer; (b) introducing an additive including an inorganic solvent, an emulsifier and starch into the monomer mixture; and (c) preparing a copolymer latex by polymerizing the monomer mixture, wherein a content of the starch is 0.1 to 4.9 parts by weight with respect to 100 parts by weight of the monomer mixture.

10 Claims, No Drawings

METHOD FOR PREPARING LATEX COMPOSITION FOR DIP-FORMING

CROSS-REFERENCE TO RELATED APPLICATION

This application claims priority to and the benefit of Korean Patent Application No. 10-2021-0067978, filed on May 27, 2021, the entire disclosure of which is incorporated herein by reference.

BACKGROUND

1. Field of the Invention

The present specification relates to a latex composition for dip forming, a preparation method thereof and a dip-formed article prepared therefrom.

2. Discussion of Related Art

Natural rubber latex was a main raw material for gloves used for medical, agricultural and livestock product processing, and industrial use in the related art. However, when gloves made from natural rubber latex are used, a protein contained in the natural rubber latex frequently causes a problem in that a glove user suffers from a contact allergic disease. Thus, attempts have been made to manufacture gloves by applying a protein-free synthetic rubber latex such as a nitrile-based copolymer latex.

A nitrile-based copolymer latex is prepared by emulsion polymerization, and an emulsifier (surfactant) used in an emulsion polymerization process serves to provide a polymerization site and maintain the stability of particles. When an anionic emulsifier is used at about 3 to 5 parts per hundred parts monomer (phm) in a typical emulsion polymerization process, it is known that it is possible to obtain a latex having excellent polymerization stability and excellent particle size and mechanical stability and storage stability of a polymer.

However, the use of an emulsifier may reduce the quality of the product by generating excessive foam during a glove manufacturing process to induce pinholes, and causes a large amount of wastewater containing the emulsifier. Further, when an emulsifier remains on gloves, the physical properties of the product may be degraded, such as the occurrence of stickiness, and problems such as foam generation or a slipping phenomenon may occur when a user wears gloves and comes into contact with moisture.

SUMMARY OF THE INVENTION

The details described in the present specification have been made in an effort to solve the above-described problems in the related art, and an object of the present specification is to provide a method for preparing a latex composition for dip forming, which has excellent mechanical stability and polymerization stability while reducing the content of an emulsifier used in a nitrile-based copolymer latex polymerization process.

Another object of the present specification is to provide a latex composition for dip forming, which has excellent mechanical properties such as tensile strength and elongation, and a dip-formed article prepared therefrom.

According to an aspect, provided is a method for preparing a latex composition for dip forming, the method including: (a) preparing a monomer mixture including a conjugated diene-based monomer, an ethylenically unsaturated nitrile monomer and an ethylenically unsaturated acid monomer; (b) introducing an additive including an inorganic solvent, an emulsifier and starch into the monomer mixture; and (c) preparing a copolymer latex by polymerizing the monomer mixture, wherein a content of the starch is 0.1 to 4.9 parts by weight with respect to 100 parts by weight of the monomer mixture.

In an exemplary embodiment, the conjugated diene-based monomer may be one selected from the group consisting of 1,3-butadiene, 2,3-dimethyl-1,3-butadiene, 2-ethyl-1,3-butadiene, 1,3-pentadiene, isoprene and a combination of two or more thereof.

In an exemplary embodiment, the ethylenically unsaturated nitrile monomer may be one selected from the group consisting of acrylonitrile, methacrylonitrile, fumaronitrile, α-chloronitrile, α-cyano ethyl acrylonitrile and a combination of two or more thereof.

In an exemplary embodiment, the ethylenically unsaturated acid monomer may be one selected from the group consisting of methacrylic acid, acrylic acid, itaconic acid, maleic acid, fumaric acid, anhydrous maleic acid, anhydrous citraconic acid, styrenesulfonic acid, monobutyl fumarate, monobutyl maleate, mono-2-hydroxypropyl maleate and a combination of two or more thereof.

In an exemplary embodiment, the emulsifier may be an ionic surfactant.

In an exemplary embodiment, the emulsifier may be one selected from the group consisting of alkylbenzene sulfonate, alkyldiphenyloxide disulfonate, aliphatic sulfonate, α-olefin sulfonate, an alkylether sulfate ester salt and a combination of two or more thereof.

In an exemplary embodiment, the emulsifier may include sodium dodecylbenzene sulfonate and disodium alkyl diphenyloxide sulfonate.

In an exemplary embodiment, a content of the emulsifier may be 0.1 to 2.9 parts by weight with respect to 100 parts by weight of the monomer mixture.

In an exemplary embodiment, the starch may be one selected from the group consisting of natural starch, a derivative of the natural starch, amylose extracted from the natural starch, modified starch, dextrin and a combination of two or more thereof.

In an exemplary embodiment, a dextrose equivalent of the dextrin may be 8 to 22.

In an exemplary embodiment, a content of the starch may be 0.25- to 2-fold the content of the emulsifier.

According to another aspect, provided is a latex composition for dip forming, which is prepared by the method for preparing a latex composition for dip forming.

According to still another aspect, provided is a dip-formed article, which is prepared by dip-forming the latex composition for dip forming.

In an exemplary embodiment, the dip-formed article may be one selected from the group consisting of medical gloves, gloves for processing agricultural and livestock products, and industrial gloves.

DETAILED DESCRIPTION OF EXEMPLARY EMBODIMENTS

The description of the present specification may be implemented in various different forms, and is therefore not limited to exemplary embodiments described herein.

Throughout the specification, when one part is "connected" to another part, this includes not only a case where they are "directly connected to each other", but also a case where they are "indirectly connected to each other" with another member interposed therebetween. Further, when one part "includes" one constituent element, unless otherwise specifically described, this does not mean that another constituent element is excluded, but means that another constituent element may be further included.

When a range of numerical values is described in the present specification, the value has the precision of significant FIGURES provided according to the standard rules in chemistry for significant FIGURES, unless a specific range thereof is stated otherwise. For example, 10 includes a range of 5.0 to 14.9, and the number 10.0 includes a range of 9.50 to 10.49.

Method for Preparing Latex Composition for Dip Forming

A method for preparing a latex composition for dip forming according to an aspect of the present specification may include: (a) preparing a monomer mixture including a conjugated diene-based monomer, an ethylenically unsaturated nitrile monomer and an ethylenically unsaturated acid monomer; (b) introducing an additive including an inorganic solvent, an emulsifier and starch into the monomer mixture; and (c) preparing a copolymer latex by polymerizing the monomer mixture.

A content of the starch may be 0.1 to 4.9 parts by weight with respect to 100 parts by weight of the monomer mixture. For example, a content of the starch may be 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1.0 part by weight, 1.1 parts by weight, 1.2 parts by weight, 1.3 parts by weight, 1.4 parts by weight, 1.5 parts by weight, 1.6 parts by weight, 1.7 parts by weight, 1.8 parts by weight, 1.9 parts by weight, 2.0 parts by weight, 2.1 parts by weight, 2.2 parts by weight, 2.3 parts by weight, 2.4 parts by weight, 2.5 parts by weight, 2.6 parts by weight, 2.7 parts by weight, 2.8 parts by weight, 2.9 parts by weight, 3.0 parts by weight, 3.1 parts by weight, 3.2 parts by weight, 3.3 parts by weight, 3.4 parts by weight, 3.5 parts by weight, 3.6 parts by weight, 3.7 parts by weight, 3.8 parts by weight, 3.9 parts by weight, 4.0 parts by weight, 4.1 parts by weight, 4.2 parts by weight, 4.3 parts by weight, 4.4 parts by weight, 4.5 parts by weight, 4.6 parts by weight, 4.7 parts by weight, 4.8 parts by weight, 4.9 parts by weight or a value between two values thereof with respect to 100 parts by weight of the monomer mixture. When the content of the starch exceeds 4.9 parts by weight with respect to 100 parts by weight of the monomer mixture, mechanical properties such as tensile strength and elongation of the formed article and product quality may be degraded.

Step (a) is a step of preparing a monomer mixture including a conjugated diene-based monomer, an ethylenically unsaturated nitrile monomer and an ethylenically unsaturated acid monomer, which are monomers constituting a nitrile-based copolymer.

The monomer mixture may include 50 to 98 wt % of a conjugated diene-based monomer, 1 to 49 wt % of an ethylenically unsaturated nitrile monomer, and 1 to 10 wt % of an ethylenically unsaturated acid monomer, based on the total weight of the monomer mixture. When the content of each monomer included in the monomer mixture is out of the above range, the formed article may be excessively softened or excessively hardened, so a user of the dip-formed article may have decreased wearing comfort, or the oil resistance of the dip-formed article may be degraded and the tensile strength may be reduced.

The conjugated diene-based monomer may be one selected from the group consisting of 1,3-butadiene, 2,3-dimethyl-1,3-butadiene, 2-ethyl-1,3-butadiene, 1,3-pentadiene, isoprene and a combination of two or more thereof, and may be, for example, 1,3-butadiene, but is not limited thereto.

The ethylenically unsaturated nitrile monomer may be one selected from the group consisting of acrylonitrile, methacrylonitrile, fumaronitrile, α-chloronitrile, α-cyano ethyl acrylonitrile and a combination of two or more thereof, and may be, for example, acrylonitrile, but is not limited thereto.

The ethylenically unsaturated acid monomer may be one selected from the group consisting of methacrylic acid, acrylic acid, itaconic acid, maleic acid, fumaric acid, anhydrous maleic acid, anhydrous citraconic acid, styrenesulfonic acid, monobutyl fumarate, monobutyl maleate, mono-2-hydroxypropyl maleate and a combination of two or more thereof, and may be, for example, methacrylic acid, but is not limited thereto.

Step (b) is a step of preparing for emulsion polymerization by introducing an additive including an inorganic solvent, an emulsifier and starch into the monomer mixture, and when starch is added, starch is adsorbed onto the surface of particles in the polymerization step to increase the repulsive force between the particles, and the content of an emulsifier used in the nitrile-based copolymer latex polymerization may be decreased by preventing the particles from aggregating to enhance stability.

The inorganic solvent may be water, and may be, for example, ion exchanged water, but is not limited thereto.

The emulsifier may be an ionic surfactant, but is not limited thereto. For example, the emulsifier may be one selected from the group consisting of an anionic surfactant, a cationic surfactant, an amphoteric surfactant and a combination of two or more thereof.

The emulsifier may be one selected from the group consisting of alkylbenzene sulfonate, alkyldiphenyloxide disulfonate, aliphatic sulfonate, α-olefin sulfonate, an alkylether sulfate ester salt and a combination of two or more thereof, but is not limited thereto.

The emulsifier may include sodium dodecylbenzene sulfonate. The sodium dodecylbenzene sulfonate has high solubility in water and an economical advantage due to its low price, but may generate a lot of foam when used alone, and may reduce the chemical stability of latex.

The emulsifier may include disodium alkyl diphenyloxide sulfonate. By using the disodium alkyl diphenyloxide sulfonate as an emulsifier, it is possible to prevent the solidification of the monomer during polymerization and increase the conversion rate of the polymerization reaction.

The emulsifier may include sodium dodecylbenzene sulfonate and disodium alkyl diphenyloxide sulfonate, but is not limited thereto. By using the emulsifier including sodium dodecylbenzene sulfonate and disodium alkyl diphenyloxide sulfonate, it is possible to prevent the solidification of the monomer mixture and the starch, increase the conversion rate of the polymerization reaction, and improve the mechanical stability, chemical stability and polymerization stability of the latex composition.

The weight ratio of the sodium dodecylbenzene sulfonate and the disodium alkyl diphenyloxide sulfonate may be 1 to 3:1, but is not limited thereto. For example, the weight ratio of the sodium dodecylbenzene sulfonate and the disodium alkyl diphenyloxide sulfonate may be 1:1, 1.5:1, 2:1, 2.5:1, 3:1 or a ratio between the two weight ratios thereof. When the weight ratio of the sodium dodecylbenzene sulfonate and the disodium alkyl diphenyloxide sulfonate is out of the above range, the conversion rate of the polymerization reaction may be lowered and mechanical stability may be degraded.

The content of the emulsifier may be 0.1 to 2.9 parts by weight with respect to 100 parts by weight of the monomer mixture. For example, the content of the emulsifier may be 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1.0 part by weight, 1.1 parts by weight, 1.2 parts by weight, 1.3 parts by weight, 1.4 parts by weight, 1.5 parts by weight, 1.6 parts by weight, 1.7 parts by weight, 1.8 parts by weight, 1.9 parts by weight, 2.0 parts by weight, 2.1 parts by weight, 2.2 parts by weight, 2.3 parts by weight, 2.4 parts by weight, 2.5 parts by weight, 2.6 parts by weight, 2.7 parts by weight, 2.8 parts by weight, 2.9 parts by weight or a value between two values thereof with respect to 100 parts by weight of the monomer mixture. When the content of the emulsifier is less than 0.1 parts by weight with respect to 100 parts by weight of the monomer mixture, mechanical stability and polymerization stability may be degraded, and when the content of the emulsifier exceeds 2.9 parts by weight with respect to 100 parts by weight of the monomer mixture, problems such as degraded product quality due to foam generation during the formed article manufacturing process, degraded product properties due to residual emulsifier, and generation of wastewater including the emulsifier may occur.

The starch may be one selected from the group consisting of natural starch, a derivative of the natural starch, amylose extracted from the natural starch, modified starch, dextrin and a combination of two or more thereof, and may be, for example, dextrin, but is not limited thereto.

The natural starch may be one selected from the group consisting of normal corn starch, waxy corn starch, high amylose corn starch, rice starch, waxy rice starch, high amylose rice starch, potato starch, sweet potato starch, tapioca starch, sorghum starch, wheat starch, sago starch, chestnut starch, bean starch and a combination of two or more thereof, but is not limited thereto.

The modified starch may be one selected from the group consisting of hydroxypropyl starch, starch phosphate, oxidized starch, pregelatinized starch, octenyl succinic acid-substituted starch, starch acetate and a combination of two or more thereof, but is not limited thereto.

The dextrin is a low molecular weight carbohydrate obtained by hydrolyzing starch, may be obtained by hydrolyzing natural starch with an acid, heat, an enzyme, and the like, and may be purchased and used commercially. The acid used for the hydrolysis may be hydrochloric acid, sulfuric acid, nitric acid or acetic acid, but is not limited thereto. The enzyme can be any enzyme as long as it has the ability to hydrolyze starch, and may be, for example, one selected from the group consisting of alpha-amylase, beta-amylase, glucoamylase, amyloglucosidase, isoamylase, pullulanase, alpha-glucosidase and a combination of two or more thereof, but is not limited thereto.

The dextrose equivalent (DE) of the dextrin may be 8 to 22, and may be, for example, 8, 9, 10, 11, 12, 13, 14, 15, 16, 17, 18, 19, 20, 21, 22 or a value between two values thereof. When the dextrose equivalent of the dextrin is less than 8, a latex gelation phenomenon occurs during polymerization, and thus the quality of the formed article may be degraded, and when the dextrose equivalent of the dextrin exceeds 22, viscosity may be decreased and a browning phenomenon may occur.

The dextrin may have a molecular weight of 1,000 to 10,000 g/mol, but the molecular weight is not limited thereto.

The content of the starch may be 0.25- to 2-fold the content of the emulsifier. For example, the content of the starch may be 0.25-fold, 0.3-fold, 0.35-fold, 0.4-fold, 0.45-fold, 0.5-fold, 0.55-fold, 0.6-fold, 0.65-fold, 0.7-fold, 0.75-fold, 0.8-fold, 0.85-fold, 0.9-fold, 0.95-fold, 1-fold, 1.05-fold, 1.1-fold, 1.15-fold, 1.2-fold, 1.25-fold, 1.3-fold, 1.35-fold, 1.4-fold, 1.45-fold, 1.5-fold, 1.55-fold, 1.6-fold, 1.65-fold, 1.7-fold, 1.75-fold, 1.8-fold, 1.85-fold, 1.9-fold, 1.95-fold, 2-fold the content of the emulsifier or a value between two values thereof. When the content of the starch is less than 0.25-fold the content of the emulsifier, mechanical stability and polymerization stability may be degraded, and an effect of reducing the amount of emulsifier is reduced, so problems such as degraded product quality due to foam generation during the dip-formed article manufacturing process, degraded product properties due to residual emulsifier, and generation of wastewater including the emulsifier may occur. When the content of the starch exceeds 2-fold the content of the emulsifier, mechanical properties such as tensile strength and elongation of the formed article and product quality may be degraded.

The additive may further include a molecular weight adjuster. The molecular weight adjuster may be one selected from the group consisting of mercaptans such as α-methylstyrene dimers, t-dodecyl mercaptan, n-dodecyl mercaptan, and octyl mercaptan; halogenated hydrocarbons such as carbon tetrachloride, methylene chloride and methylene bromide; sulfur-containing compounds such as tetraethylthiuram disulfide, dipentamethylenethiuram disulfide and diisopropylxanthogen disulfide, and a combination of two or more thereof, and may be, for example, t-dodecyl mercaptan, but is not limited thereto. The content of the molecular weight adjuster may be 0.1 to 1.0 part by weight with respect to 100 parts by weight of the monomer mixture.

Step (c) is a step of preparing a copolymer latex by emulsion polymerization of the monomer mixture, the copolymer latex prepared by the polymerization has a solid concentration of 30 to 60%, for example, 30%, 32%, 34%, 36%, 38%, 40%, 42%, 44%, 46%, 48%, 50%, 52%, 54%, 56%, 58%, 60% or a range between two values thereof, and the pH may be adjusted to 7 to 12, for example, 7.0, 7.2, 7.4, 7.6, 7.8, 8.0, 8.2, 8.4, 8.6, 8.8, 9.0, 9.2, 9.4, 9.6, 9.8, 10.0, 10.2, 10.4, 10.6, 10.8, 11.0, 11.2, 11.4, 11.6, 11.8, 12.0 or a range between two values thereof, but is not limited thereto.

The polymerization in Step (c) may be performed at 10 to 90° C., and may be performed at 10° C., 15° C., 20° C., 25° C., 30° C., 35° C., 40° C., 45° C., 50° C., 55° C., 60° C., 65° C., 70° C., 75° C., 80° C., 85° C., 90° C. or a temperature between two temperatures thereof.

Step (c) may include: polymerizing the monomer mixture by introducing a polymerization initiator; stopping the polymerization by introducing a polymerization terminator; and obtaining a copolymer latex by removing an unreacted monomer and adjusting the solid concentration and the pH.

The polymerization initiator may be one selected from the group consisting of an inorganic peroxide such as sodium persulfate, potassium persulfate, ammonium persulfate, potassium perphosphate, and hydrogen peroxide; an organic peroxide such as t-butylperoxide, cumene hydroperoxide, p-menthane hydroperoxide, di-t-butyl peroxide, t-butylcumyl peroxide, acetyl peroxide, isobutyryl peroxide, octanoyl peroxide, benzoyl peroxide, 3,5,5-trimethylhexanoyl peroxide, and t-butylperoxy isobutyrate; azobisisobutyronitrile, azobis-2,4-dimethylvaleronitrile, azobis cyclohexanecarbonitrile, methyl azobisisolactate (butyrate) and a combination of two or more thereof, and may be, for example, potassium peroxodisulfate, but is not limited thereto. The content of the polymerization initiator may be 0.02 to 1.5 parts by weight with respect to 100 parts by weight of the monomer mixture.

The copolymer latex may be polymerized by including an activator, and the activator may be one selected from the group consisting of sodium formaldehyde sulfoxylate, sodium ethylenediamine tetraacetate, ferrous sulfate, dextrose, sodium pyrrolinate, sodium sulfite and a combination of two or more thereof, and may be, for example, sodium formaldehyde sulfoxylate, but is not limited thereto. The content of the activator may be 0.01 to 0.3 parts by weight with respect to 100 parts by weight of the monomer mixture.

The polymerization terminator may be introduced when the conversion rate of the polymerization reaction is 90% or more, and for example, the polymerization terminator may be introduced when the conversion rate of the polymerization reaction is 90%, 91%, 92%, 93%, 94%, 95%, 96%, 97%, 98%, 99%, 99.9% or a value between two values thereof.

The polymerization terminator may be one selected from the group consisting of hydroxylamine, hydroxylamine sulfate, diethylhydroxyamine, hydroxylaminesulfonic acid and an alkali metal ion thereof, sodium dimethyldithiocarbamate, a hydroquinone derivative, an aromatic hydroxydithiocarboxylic acid such as hydroxy diethylbenzenedithiocarboxylic acid and hydroxydibutylbenzenedithiocarboxylic acid, and a combination of two or more thereof, and may be, for example, sodium dimethyldithiocarbamate, but is not limited thereto. The content of the polymerization terminator may be 0.02 to 1.5 parts by weight with respect to 100 parts by weight of the monomer mixture.

The solid concentration and pH of the copolymer latex may be adjusted by introducing an additive such as a pH adjuster, an antioxidant, and an antifoaming agent.

The pH adjuster may be an aqueous potassium hydroxide solution or aqueous ammonia, but is not limited thereto.

The copolymer latex has excellent mechanical stability and polymerization stability, and thus may be applied to the preparation of a stable latex composition for dip forming.

The method for preparing a latex composition for dip forming may further include: (d) preparing a latex composition for dip forming by introducing a vulcanizing agent, a vulcanization accelerator and a cross-linking agent into the copolymer latex.

The vulcanizing agent may include sulfur such as powdered sulfur, precipitated sulfur, colloidal sulfur, surface-treated sulfur, and insoluble sulfur. Since such a vulcanizing agent attacks a pi bond in the conjugated double bond of butadiene to cross-link between the polymer chains, it is possible to impart elasticity to the copolymer and to improve the chemical resistance of the dip-formed article. The content of the vulcanizing agent may be 0.1 to 3.0 parts by weight with respect to 100 parts by weight of the copolymer latex.

The vulcanization accelerator may be one selected from the group consisting of 2-mercaptobenzothiazole, 2,2-dithiobisbenzothiazole-2-sulfenamide, N-cyclohexylbenzothiazole-2-sulfenamide, 2-morpholinothiobenzothiazole, tetramethylthiuram monosulfide, tetramethylthiuram disulfide, zinc diethyldithiocarbamate, zinc diethyldithiocarbamate, zinc dibutyldithiocarbamate, diphenylguanidine, di-o-tolylguanidine and a combination of two or more thereof, and may be, for example, zinc dibutyldithiocarbamate, but is not limited thereto. The content of the vulcanization accelerator may be 0.1 to 3.0 parts by weight with respect to 100 parts by weight of the copolymer latex.

The cross-linking agent may be zinc oxide, but is not limited thereto. The content of the cross-linking agent may be 0.1 to 3.0 parts by weight with respect to 100 parts by weight of the copolymer latex.

Latex Composition for Dip Forming

The latex composition for dip forming according to another aspect of the present specification may be prepared by the method for preparing a latex composition for dip forming.

The latex composition for dip forming may have a solid concentration of 10 to 30% and a pH of 9 to 11, but the solid concentration and the pH are not limited thereto.

Dip-Formed Article

The dip-formed article according to still another aspect of the present specification may be prepared by dip forming the latex composition for dip forming.

The dip-formed article has excellent mechanical properties such as tensile strength and elongation, has a low defect rate, and has excellent quality such as sense of touch, and thus may be applied to dip-formed articles in various fields.

The dip-formed article may be one selected from the group consisting of medical gloves, gloves for processing agricultural and livestock products, and industrial gloves, but is not limited thereto.

Hereinafter, the examples of the present invention will be described in more detail. However, the following experimental results describe only representative experimental results among the above-mentioned examples, and the scope and contents of the present specification should not be interpreted as being reduced or limited by the examples, and the like. The effects of each of various embodiments of the present specification, which are not explicitly set forth below, will be described in detail in a corresponding section.

Example 1

A 10-L high pressure reactor equipped with a stirrer, a thermometer, a cooler, and a nitrogen gas inlet and installed so as to continuously introduce each component such as a monomer, an emulsifier, and a polymerization initiator was prepared. After the reactor was substituted with nitrogen, a monomer mixture including 65 wt % of 1,3-butadiene, 30 wt % of acrylonitrile and 5 wt % of methacrylic acid based on the total weight of the mixture was introduced into the reactor. Thereafter, 1.4 parts by weight of sodium dodecylbenzene sulfonate (SDBS), 0.7 parts by weight of disodium alkyl diphenyloxide sulfonate (DPOS), 1 part by weight of dextrin having a molecular weight of 1,000 to 10,000 g/mol (Samyang Corporation), 0.5 parts by weight of t-dodecyl mercaptan, and 120 parts by weight of ion exchanged water with respect to 100 parts by weight of the monomer mixture were introduced into the reactor. After the temperature of the reactor was increased to about 25° C., 0.3 parts by weight of potassium persulfate was added.

When the conversion rate reached about 95%, 0.1 parts by weight of sodium dimethyldithiocarbamate was added to terminate the polymerization reaction. Thereafter, a carboxylic acid-modified nitrile-based copolymer latex having a solid concentration of 45% and a pH of 8.5 was obtained by removing an unreacted monomer and the like through a deodorizing process and adding aqueous ammonia, an antioxidant, an antifoaming agent and the like.

Example 2

A carboxylic acid-modified nitrile-based copolymer latex was obtained in the same manner as in Example 1, except that 3 parts by weight of dextrin was added.

Example 3

A carboxylic acid-modified nitrile-based copolymer latex was obtained in the same manner as in Example 1, except that 1.0 part by weight of sodium dodecylbenzene sulfonate and 0.5 parts by weight of disodium alkyl diphenyloxide sulfonate were added.

Example 4

A carboxylic acid-modified nitrile-based copolymer latex was obtained in the same manner as in Example 3, except that 3 parts by weight of dextrin was added.

Comparative Example 1

A carboxylic acid-modified nitrile-based copolymer latex was obtained in the same manner as in Example 1, except that 2.0 part by weight of sodium dodecylbenzene sulfonate and 1.0 part by weight of disodium alkyl diphenyloxide sulfonate were added and dextrin was not added.

Comparative Example 2

A carboxylic acid-modified nitrile-based copolymer latex was obtained in the same manner as in Example 1, except that 5 parts by weight of dextrin was added.

Comparative Example 3

A carboxylic acid-modified nitrile-based copolymer latex was obtained in the same manner as in Example 3, except that 5 parts by weight of dextrin was added.

Comparative Example 4

A carboxylic acid-modified nitrile-based copolymer latex was obtained in the same manner as in Example 3, except that 10 parts by weight of dextrin was added.

Comparative Example 5

A carboxylic acid-modified nitrile-based copolymer latex was obtained in the same manner as in Example 3, except that 20 parts by weight of dextrin was added.

The following Table 1 summarizes the contents of sodium dodecylbenzene sulfonate (SDBS), disodium alkyl diphenyloxide sulfonate (DPOS) and dextrin used in the polymerization of the carboxylic acid-modified nitrile-based copolymer latexes of Examples 1 to 4 and Comparative Examples 1 to 5.

TABLE 1

| Classification (parts by weight) | Monomer mixture | Emulsifier SDBS | DPOS | SDBS + DPOS | Dextrin |
|---|---|---|---|---|---|
| Example 1 | 100 | 1.4 | 0.7 | 2.1 | 1 |
| Example 2 | 100 | 1.4 | 0.7 | 2.1 | 3 |
| Example 3 | 100 | 1.0 | 0.5 | 1.5 | 1 |
| Example 4 | 100 | 1.0 | 0.5 | 1.5 | 3 |
| Comparative Example 1 | 100 | 2.0 | 1.0 | 3.0 | 0 |
| Comparative Example 2 | 100 | 1.4 | 0.7 | 2.1 | 5 |
| Comparative Example 3 | 100 | 1.0 | 0.5 | 1.5 | 5 |
| Comparative Example 4 | 100 | 1.0 | 0.5 | 1.5 | 10 |
| Comparative Example 5 | 100 | 1.0 | 0.5 | 1.5 | 20 |

Preparation Example

A latex composition for dip forming, the composition having a solid concentration of 18% and a pH of 10.0 was prepared by adding 1.0 part by weight of sulfur, 1.4 parts by weight of zinc oxide and 0.6 parts by weight of zinc dibutyldithiocarbamate (ZDBC) to 100 parts by weight of each carboxylic acid-modified nitrile-based copolymer latex prepared according to Examples 1 to 4 and Comparative Examples 1 to 5 and adding a 4% aqueous potassium hydroxide solution and secondary distilled water.

Experimental Example 1: Evaluation of Mechanical Properties

A dumbbell-shaped test piece was produced in accordance with ASTM D-412 from each latex composition for dip forming prepared according to the Preparation Example. Mechanical properties were evaluated by pulling the test piece at an elongation speed of 500 mm/min and measuring tensile strength and elongation at break using a universal testing machine (UTM). Typically, the higher the tensile strength and elongation of a latex-formed article, the better the evaluation of dip quality.

The following Table 2 shows the results of evaluating the mechanical properties of test pieces produced from the latexes of Examples 1 and 2 and Comparative Examples 1 and 2.

TABLE 2

| Classification | Tensile strength (mPa) | Elongation (%) |
|---|---|---|
| Example 1 | 39.1 | 560 |
| Example 2 | 38.3 | 553 |
| Comparative Example 1 | 38.1 | 553 |
| Comparative Example 2 | 29.7 | 535 |

Referring to Table 2, it can be confirmed that the tensile strength and elongation of the test pieces produced from the latexes of Examples 1 and 2 are excellent compared to the test piece produced from the latex of Comparative Example 1. These results show that when starch is added in the polymerization step of the nitrile-based copolymer latex, the mechanical properties and dip quality of the formed article are maintained or improved even though only 70% of the amount of emulsifier used in the related art is added.

However, it was confirmed that in the case of Comparative Example 2 in which the content of dextrin exceeds 4.9 parts by weight with respect to 100 parts by weight of the monomer mixture, the tensile strength and elongation were reduced, and thus failed to satisfy the mechanical properties of the test piece produced from the latex of Comparative Example 1.

The following Table 3 shows the results of evaluating the mechanical properties of test pieces produced from the latexes of Examples 3 and 4 and Comparative Examples 1 and 3 to 5.

TABLE 3

| Classification | Tensile strength (mPa) | Elongation (%) |
|---|---|---|
| Example 3 | 39.9 | 563 |
| Example 4 | 38.3 | 581 |
| Comparative Example 1 | 38.1 | 553 |
| Comparative Example 3 | 30.2 | 532 |
| Comparative Example 4 | 25.1 | 489 |
| Comparative Example 5 | 11.5 | 442 |

Referring to Table 3, it can be confirmed that the tensile strength and elongation of the test pieces produced from the latexes of Examples 3 and 4 are excellent compared to the test piece produced from the latex of Comparative Example 1. These results show that when starch is added in the polymerization step of the nitrile-based copolymer latex, the mechanical properties and dip quality of the formed article are maintained or improved even though only 50% of the amount of emulsifier used in the related art is added.

However, it was confirmed that in the case of Comparative Examples 3 to 5 in which the content of dextrin exceeds 4.9 parts by weight with respect to 100 parts by weight of the monomer mixture, the tensile strength and elongation were reduced, and thus failed to satisfy the mechanical properties of the test piece produced from the latex of Comparative Example 1.

Experimental Example 2: Evaluation of Mechanical Stability

A latex stability test (Maron test) was performed to evaluate the mechanical stability of each of the carboxylic acid-modified nitrile-based copolymer latex prepared according to Examples 1 to 4 and Comparative Examples 1 to 5. In the latex stability test, 30 g of a latex sample was placed in a sample frame using a Maron test apparatus, and the weight of aggregates produced after applying shear stress at 49 N and 1000 rpm for 1 minute was measured. The lower the weight of the aggregates produced during the latex stability test, the better the evaluation of mechanical stability.

The following Table 4 shows the results of evaluating the mechanical stability of the latexes of Examples 1 and 2 and Comparative Examples 1 and 2.

TABLE 4

| Classification | Aggregate weight (ppm) |
|---|---|
| Example 1 | 3,600 |
| Example 2 | 1,800 |
| Comparative Example 1 | 2,790 |
| Comparative Example 2 | 1,000 |

Referring to Table 4, it can be confirmed that the mechanical stability of the latex of Example 2 is excellent compared to the latex of Comparative Example 1. These results show that when starch is added in the polymerization step of the nitrile-based copolymer latex, the mechanical stability of the latex is maintained or improved even though only 70% of the amount of emulsifier used in the related art is added.

The following Table 5 shows the results of evaluating the mechanical stability of the latexes of Examples 3 and 4 and Comparative Examples 1 and 3 to 5.

TABLE 5

| Classification | Aggregate weight (ppm) |
|---|---|
| Example 3 | 3,890 |
| Example 4 | 2,340 |
| Comparative Example 1 | 2,810 |
| Comparative Example 3 | 1,450 |
| Comparative Example 4 | 1,000 |
| Comparative Example 5 | 830 |

Referring to Table 5, it can be confirmed that the mechanical stability of the latex of Example 4 is excellent compared to the latex of Comparative Example 1. These results show that when starch is added in the polymerization step of the nitrile-based copolymer latex, the mechanical stability of the latex is maintained or improved even though only 50% of the amount of emulsifier used in the related art is added.

Experimental Example 3: Evaluation of Polymerization Stability

In order to evaluate the latex polymerization stability of Examples 1 to 4 and Comparative Examples 1 to 5, the degree of contamination of the reactor was measured after each polymerization process was completed, and evaluated by a 5-point method (5: very good, 4: good, 3: fair, 2: bad, and 1: very bad).

The following Table 6 shows the results of evaluating the mechanical stability of Examples 1 and 2 and Comparative Examples 1 and 2.

TABLE 6

| Classification | Polymerization stability (5-point method) |
|---|---|
| Example 1 | 3 |
| Example 2 | 4 |
| Comparative Example 1 | 2 |
| Comparative Example 2 | 3 |

Referring to Table 6, it can be confirmed that the mechanical stability of Examples 1 and 2 is excellent compared to Comparative Example 1. These results show that when starch is added in the polymerization step of the nitrile-based copolymer latex, the mechanical stability in the latex polymerization process is maintained or improved even though only 70% of the amount of emulsifier used in the related art is added.

The following Table 7 shows the results of evaluating the polymerization stability of Examples 3 and 4 and Comparative Examples 1 and 3 to 5.

TABLE 7

| Classification | Polymerization stability (5-point method) |
|---|---|
| Example 3 | 3 |
| Example 4 | 4 |
| Comparative Example 1 | 3 |
| Comparative Example 3 | 4 |
| Comparative Example 4 | 5 |
| Comparative Example 5 | 5 |

Referring to Table 7, it can be confirmed that the mechanical stability of Examples 3 and 4 is excellent compared to Comparative Example 1. These results show that when starch is added in the polymerization step of the nitrile-based copolymer latex, the mechanical stability in the latex polymerization process is maintained or improved even though only 50% of the amount of emulsifier used in the related art is added.

The method for preparing a latex composition for dip forming according to an aspect of the present specification is eco-friendly and also has excellent mechanical stability and polymerization stability by reducing the content of an emulsifier used in a copolymer latex polymerization process, and thus can be applied to the preparation of a stable latex composition for dip forming.

The latex composition for dip forming according to another aspect of the present specification and a dip-formed article prepared therefrom have excellent mechanical properties such as tensile strength and elongation, and excellent quality, and thus can be applied to the manufacture of medical gloves, gloves for processing agricultural and livestock products, industrial gloves, and the like.

The effect of an aspect of the present specification is not limited to the aforementioned effects, and it should be understood to include all possible effects deduced from the configuration described in the detailed description or the claims of the present specification.

The above-described description of the present specification is provided for illustrative purposes, and those skilled in the art to which an aspect of the present specification pertains will understand that the present specification can be easily modified into other specific forms without changing the technical spirit or essential features described in the present specification. Therefore, it should be understood that the above-described examples are only illustrative in all aspects and not restrictive. For example, each constituent element which is described as a singular form may be implemented in a distributed form, and similarly, constituent elements which are described as being distributed may be implemented in a combined form.

The scope of the present specification is represented by the following claims, and it should be interpreted that the meaning and scope of the claims and all the changes or modified forms derived from the equivalent concepts thereof fall within the scope of the present specification.

What is claimed is:

1. A method for preparing a latex composition for dip forming, the method comprising:
   (a) preparing a monomer mixture comprising a conjugated diene-based monomer, an ethylenically unsaturated nitrile monomer and an ethylenically unsaturated acid monomer;
   (b) introducing an additive comprising an inorganic solvent, an emulsifier and starch into the monomer mixture; and
   (c) preparing a copolymer latex by polymerizing the monomer mixture,
   wherein the emulsifier comprises sodium dodecylbenzene sulfonate and disodium alkyl diphenyloxide sulfonate,
   a content of the emulsifier is 0.1 to 2.9 parts by weight with respect to 100 parts by weight of the monomer mixture, and
   a content of the starch is 0.1 to 4.9 parts by weight with respect to 100 parts by weight of the monomer mixture.

2. The method of claim 1, wherein the conjugated diene-based monomer is one selected from the group consisting of 1,3-butadiene, 2,3-dimethyl-1,3-butadiene, 2-ethyl-1,3-butadiene, 1,3-pentadiene, isoprene and a combination of two or more thereof.

3. The method of claim 1, wherein the ethylenically unsaturated nitrile monomer is one selected from the group consisting of acrylonitrile, methacrylonitrile, fumaronitrile, α-chloronitrile, α-cyano ethyl acrylonitrile and a combination of two or more thereof.

4. The method of claim 1, wherein the ethylenically unsaturated acid monomer is one selected from the group consisting of methacrylic acid, acrylic acid, itaconic acid, maleic acid, fumaric acid, anhydrous maleic acid, anhydrous citraconic acid, styrenesulfonic acid, monobutyl fumarate, monobutyl maleate, mono-2-hydroxypropyl maleate and a combination of two or more thereof.

5. The method of claim 1, wherein the starch is one selected from the group consisting of natural starch, a derivative of the natural starch, amylose extracted from the natural starch, modified starch, dextrin and a combination of two or more thereof.

6. The method of claim 5, wherein a dextrose equivalent of the dextrin is 8 to 22.

7. The method of claim 1, wherein a content of the starch is 0.25- to 2-fold the content of the emulsifier.

8. A latex composition for dip forming prepared by the method of claim 1.

9. A dip-formed article prepared by dip forming the latex composition of claim 8.

10. The dip-formed article of claim 9, wherein the dip-formed article is one selected from the group consisting of medical gloves, gloves for processing agricultural and livestock products, and industrial gloves.

* * * * *